No. 790,114. PATENTED MAY 16, 1905.
A. L. DIXON.
VEHICLE TIRE FASTENER.
APPLICATION FILED SEPT. 17, 1904.

WITNESSES
J. P. Fristen
C. J. Garvey.

INVENTOR
ARTHUR L. DIXON
BY W. T. Miller
ATTORNEY

No. 790,114. Patented May 16, 1905.

UNITED STATES PATENT OFFICE.

ARTHUR L. DIXON, OF BUFFALO, NEW YORK.

VEHICLE-TIRE FASTENER.

SPECIFICATION forming part of Letters Patent No. 790,114, dated May 16, 1905.

Application filed September 17, 1904. Serial No. 224,854.

*To all whom it may concern:*

Be it known that I, ARTHUR L. DIXON, a citizen of the United States, residing at Buffalo, in the county of Erie and State of New York, have invented certain new and useful Improvements in Vehicle-Tire Fasteners; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in vehicle-tire fasteners, and more particularly to that type employed in securing pneumatic and cushion tires to the rims of wheels.

The object of my invention is to provide a simple and effective construction whereby a tire can be quickly attached in position around the rim and removed therefrom with equal facility.

Another important object is to absolutely prevent any "creeping" of the tire upon the rim.

To these ends my invention consists of certain details of construction, all of which will be fully hereinafter described and claimed.

Figure 1:
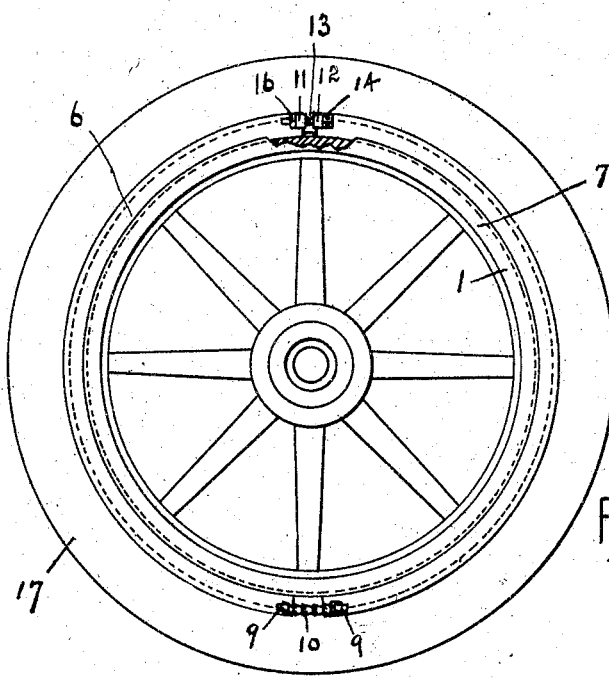
Figure 2:
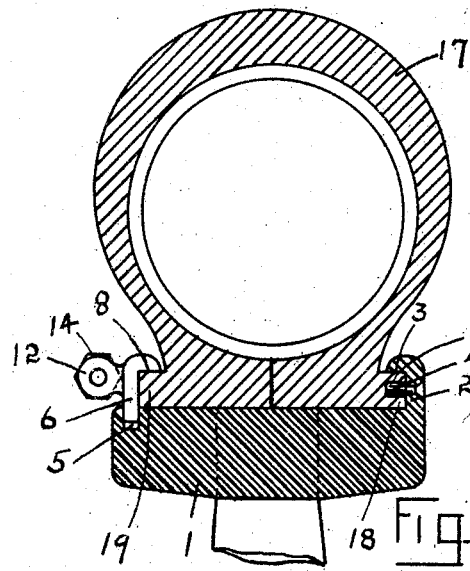
Figure 3:
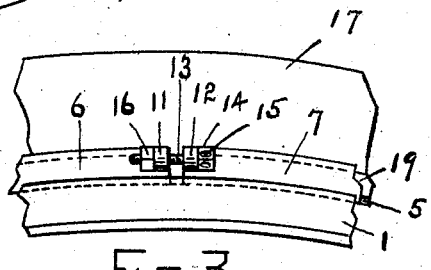
Figure 4:
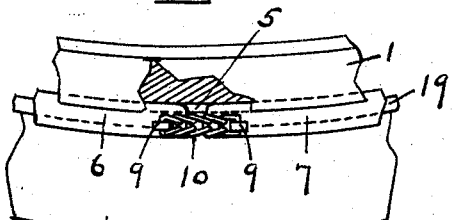

In the drawings, Figure 1 is a side elevation of a vehicle-wheel embodying my invention. Fig. 2 is an enlarged transverse section through the tire and rim, and Figs. 3 and 4 are enlarged details of the tightening-band.

Referring to the drawings, it will be seen that I have shown my invention as applied to the wheel of an automobile, of which 1 is the flat rim. On one side of the periphery of this rim is arranged an annular flange 2, having the inwardly-projecting annular shoulder 3. This flange and shoulder may be integral with the material of the rim, or it may be of separate construction and rigidly secured thereto. On the inner face of this flange 2 and midway between the periphery of the rim and the shoulder 3 are arranged a series of spaced pins 4, projecting inwardly. These pins 4 may be integral with the flange or may be separately inserted and secured. On the opposite side of the periphery of rim 1 and in its face is the annular groove 5. My improved tightening-band is composed of two semicircular sections 6 and 7, composed of flat metal and adapted for snug adjustable compressing holding engagement with the annular groove 5 in the rim 1, as clearly shown in Fig. 2. These sections 6 and 7 have inwardly-projecting annular shoulders 8, similar to the shoulder 3 on the opposite flange 2. On one side these semicircular sections 6 and 7 are adjustably joined by the hooks 9 and the interposed length of chain 10. On the opposite side a tightening-union is provided as follows: At the contiguous ends of the sections 6 and 7 are the outwardly-extending lugs 11 and 12. A tightening-bolt 13 passes loosely through lug 12 and has screw-threaded engagement with lug 11. The head 14 of the bolt 13 is provided with the sockets 15 for the insertion of a turning-pin. When the proper tension is acquired, a lock-nut 16 holds the bolt 13 from turning.

The outer tube 17 of the pneumatic tire shown is provided with the side holding-flanges 18 and 19, which rest under the shoulders 3 and 8 of the flange 2 and band 6, respectively. In the flange 18 are arranged a series of spaced sockets 20, adapted for the holding reception of the spaced pins 4, which absolutely prevent the creeping of the flange 18 of the tire. Similar sockets may be made in the opposite flange 19 in order that the tire may be reversed. The creeping of the opposite flange 19 of the tire is prevented by the tightening-band 6 7, which firmly compresses such flange between the shoulder 8 and the periphery of the rim. Should the bolt 13 fail to effect the proper tension of the tightening-band 6 7, especially after the flange 18 of the tire becomes thinner through continued compression, then the chain 10 comes into play, as the hook 9 on the section 6 may be shifted at will to any of the links of such chain to draw the sections 6 and 7 closer together in order to make the tightening-bolt 13 properly effective.

I claim—

1. The combination with a flanged tire, of a wheel-rim provided on one side with a shouldered flange adapted for holding engagement with one of the flanges of the tire, and on the other side with an annular groove in its periphery, and a sectional shouldered tightening-band adapted for joint adjustable compressing holding engagement with the other flange of the tire and the annular groove in the periphery of the rim.

2. The combination with a flanged tire having one of its flanges provided with a series of spaced sockets, of a wheel-rim provided on one side with a shouldered flange adapted for holding engagement with one of the flanges of the tire, and on the other side with an annular groove in its periphery, a series of spaced pins on the shouldered flange adapted for holding engagement with the spaced sockets on the tire-flange, and a sectional shouldered tightening-band adapted for joint holding engagement with the other flange of the tire and the annular groove in the periphery of the rim.

3. The combination with a flanged tire, of a wheel-rim provided on one side with a shouldered flange adapted for holding engagement with one of the flanges of the tire and on the other side with an annular groove in its periphery, and a shouldered tightening-band consisting of sections joined with lengthening means on one side and with tightening means on the other side, and adapted for joint holding engagement with the other flange of the tire and the annular groove in the periphery of the rim.

4. The combination with a flanged tire having one of its flanges provided with a series of spaced sockets, of a wheel-rim provided on one side with a shouldered flange adapted for holding engagement with one of the flanges of the tire and on the other side with an annular groove in its periphery, a series of spaced pins on the shouldered flange adapted for holding engagement with the spaced sockets in the tire-flange, and a shouldered tightening-band consisting of sections joined with lengthening means on one side and with tightening means on the other side and adapted for joint holding engagement with the other flange of the tire and the annular groove in the periphery of the rim.

In testimony whereof I have signed my name to this specification in the presence of two subscribing witnesses.

ARTHUR L. DIXON.

Witnesses:
   CHAS. J. GAWRY,
   W. T. MILLER.